United States Patent [19]

Boggs

[11] 4,430,958

[45] Feb. 14, 1984

[54] TIRE HANDLING AND SPRAYING APPARATUS

[75] Inventor: Joseph C. Boggs, Nashville, Tenn.

[73] Assignee: Armstrong Rubber Company, Madison, Tenn.

[21] Appl. No.: 367,568

[22] Filed: Apr. 12, 1982

[51] Int. Cl.$^3$ ............................................... B05C 5/00
[52] U.S. Cl. .................................. 118/668; 118/704; 118/318; 118/319
[58] Field of Search ............... 118/318, 676, 319, 668, 118/704; 427/233, 425

[56] References Cited

U.S. PATENT DOCUMENTS

| | | | |
|---|---|---|---|
| 1,763,611 | 6/1930 | Brown . | |
| 2,426,391 | 8/1947 | Emerson | 118/319 X |
| 2,927,679 | 3/1960 | Rively | 198/40 |
| 2,930,345 | 3/1960 | Jacobsen et al. | 118/319 X |
| 3,718,216 | 2/1973 | Wilson | 214/1 BC |
| 3,730,356 | 5/1973 | Bossons | 214/1 BC |
| 3,962,987 | 6/1976 | Brandl | 118/318 X |
| 4,202,228 | 5/1980 | Göransson | 83/23 |

FOREIGN PATENT DOCUMENTS 167628 2/1965 U.S.S.R. ............................... 118/318

Primary Examiner—John P. McIntosh
Attorney, Agent, or Firm—Luedeka & Neely

[57] ABSTRACT

The specification discloses an apparatus (10) for handling and spraying a fluid on a tire (12) in which a plurality of arms (32, 33, 34 and 35) rotate about a center axis with a head (46, 48, 118 and 176) mounted on the distal end of each arm. A tire grasping finger set (56) is mounted on each head. The finger set (56) is operable to grasp a tire, move it in a circular path into a spray station, spin the tire while spraying the interior and exterior thereof, move the tire to an idle station, move the tire to a discharge station and then discharge the tire onto a conveyor table (114). A rotary indexer (32) is used to rotate the radial arms (32, 33, 34 and 35) with the indexer causing the arms to pause at 90 degree intervals. When the rotary indexer causes a pause, a clutch is disengaged to disengage the drive of an electric motor (26) from the rotary indexer, and a brake is applied to hold the position of the arms fixed for a time interval. After such time interval, the brake is disengaged and the clutch is reengaged so that the motor (26) will drive the radial arms 32, 33, 34 and 35 through a radial distance of 90 degrees before pausing again.

17 Claims, 8 Drawing Figures

TIRE HANDLING AND SPRAYING APPARATUS

FIELD OF INVENTION

The present invention relates to the field of tire handling and spraying apparatuses and methods and particularly relates to a rotary tire handling and spraying apparatus and method having tiregrasping finger sets mounted on a rotating stand that is rotatably indexed to move the finger sets through a circular path to work stations.

BACKGROUND OF THE INVENTION

In tire manufacturing it is necessary or desirable to apply a lubricant to the interior of the tire in order to prepare it for a subsequent heat forming and molding process. At the same time that the lubricant is applied to the interior of the tire, it is convenient to apply paint to the exterior of the tire.

A typical apparatus and method for performing this lubricating and spraying function operates using a linear motion to move the tires to and from various work stations. In such conventional apparatuses and methods, there are typically included a load station, a spray station and a discharge station. The tire is grasped or picked up at the load station by fingers that usually grasp the interior rim of a tire. The fingers are grouped in a finger set and the finger set is typically slideably mounted and carried on an overhead track. The finger set is moved linearly along the track by a chain or belt connected to the fingers. Typically, the chain or belt is an endless loop carried on two spaced sprockets or pulleys, and the finger set is connected to one side of the loop. The tire is moved by the finger set from the load station to the spray station, and at the spray station, the tire is spun while the interior of the tire is sprayed with a lubricant and the exterior of the tire is sprayed with a paint. After the spraying process is completed, the tire and finger set moves toward the load position until the tire is above a discharge station, usually a conveyor belt, where the tire is released and is transported away from the apparatus by the conveyor belt or other discharge apparatus. Finally, the finger set returns to the load position to pick up another tire and the process begins again.

The linear, back and forth, motion of conventional tire handling and spraying apparatuses and methods have been found to be inefficient and illsuited for the operation to be performed by this type of machine. In such conventional machines, the tiregrasping finger set is driven by a chain or belt that is in turn driven by a motor. The chain, and the finger set and the tire must be driven by the motor first in one direction, then stopped, then driven in the opposite direction. The process of stopping and reversing the direction of the chain, the finger set and the tire is an abrupt and rough motion that places undue stress and strain on the equipment. It is difficult and expensive to manufacture a linear motion machine that will smoothly and rapidly accelerate and decelerate using the conventional drive mechanism and, thus, the mechanism is susceptible to rapid wear problems.

Another problem with the linear, back and forth, motion of conventional machines is that the various work stations and the operators running the machine must remain idle for significant periods of time while the tire is at another work station. While the tire and the finger set are in the spray station, the load station and the discharge station are idle. Assuming that there are personnel at the load station and the discharge station to feed tires into the machine and to remove tires from the machine, such personnel will also be idle when the tire and finger set are in the spray position. When the finger set and tire are in the load station, the discharge station and the spray station are idle. And, when the finger set and tire are in the discharge station, the load station and the spray station are idle. The long idle times at each station results in low productivity for both the machine and the personnel operating it.

Also, in the conventional tire handling and spraying apparatuses and methods using a linear motion, it is necessary that one of the work stations be located between the other two work stations. Thus, at some point during the process of moving a tire through the machine, the tire must pass through a work station without performing an operation on the tire at such work station. For example, in one such conventional machine, the discharge station is located between the spray station and the load station. Thus, after the tire is loaded at the load station, it must pass over and through the discharge station on its way to the spray station. The necessity of passing through the discharge station requires that the discharge station be idle at such time and it increases the travel distance and time of the tire and finger set as it moves from the load station to the spray station.

Thus, a need has arisen for an apparatus and method for handling and spraying a tire that reduces the idle time at the work stations relative to known conventional machines, that provides a smooth work motion that is less strenuous and less abrupt than the linear, back and forth, motion of known conventional machines, and that otherwise solves the problems inherent in conventional tire handling and spraying apparatuses and methods.

SUMMARY OF INVENTION

The foregoing and other problems long associated with conventional tire handling and spraying apparatuses and methods are solved by the present invention in which an apparatus and method for handling a tire and spraying a fluid on the tire includes a center stand having a center axis about which the center stand is rotatable. A tiregrasping mechanism for selectively grasping and releasing a tire is mounted on the center stand at a position distal from the center axis thereof so that the rotation of the center stand moves the tiregrasping mechanism in a circular path about the center stand. A stand drive mechanism selectively rotates the center stand and selectively stops the rotation of the center stand in at least one position. Thus, the stand drive mechanism rotates the tiregrasping mechanism in a circular path about the center axis and stops the movement of the tiregrasping mechanism in at least one position, such as a spray position. Spray apparatus is provided for spraying fluid on the tire that is grasped by the tiregrasping mechansim and is stopped. In the preferred embodiment of the invention, the stand drive mechanism includes a rotary indexer for rotating the center stand and for pausing the rotation of the center stand when the tiregrasping means is in a spray position adjacent to the spray apparatus.

In accordance with a more particular embodiment of the present invention, an apparatus for handling a tire with an interior rim and spraying a fluid on the tire includes a rotatable center stand having a center axis about which the stand is rotatable, and at least one rotatable head is mounted on the center stand and has a head axis about which the head is rotatable. At least one tiregrasping mechanism extends from the head for selectively grasping and releasing the interior rim of the tire and is operable to rotate in unison with the head to selectively spin the tire. A stand drive mechanism selectively rotates the center stand to move the head and tiregrasping mechanism in a circular path about the center axis and selectively stops the rotation of the center stand in at least three positions to stop the head and tire grasping mechanism in a load position, a spray position and a discharge position. A head drive mechanism selectively rotates the head to rotate the tiregrasping mechanism, and a first actuating mechanism is provided for actuating the tiregrasping mechanism to grasp the interior rim of the tire when the head and the tiregrasping mechanism are stopped in the load position. A second actuating mechanism actuates the head drive mechanism to rotate the head about the head axis to rotate the tiregrasping mechanism and spin the tire when the head is in the spray position, and a third actuating mechanism actuates the tiregrasping means to release the interior rim of the tire when the head is in the discharge position. A spraying apparatus sprays fluid on the tire when the head, tiregrasping mechanism and tire are in the spray position.

The stand drive mechanism described above may include a motor and clutch with the motor output connected to the clutch input. A rotary indexer has an input connected to the output of the clutch and has an output connected to rotate the center stand. The rotary indexer operates to pause the rotation of the center stand at least when the head is positioned in the load position, the spray position, and the discharge position, and a brake is connected to selectively brake the rotation of the center stand when the head is in the load position, the spray position and the discharge position. A control system operates to disengage the clutch to disengage the output of the motor from the rotary indexer for a time interval, to engage the brake to brake the rotation of the center stand for the time interval and to reengage the clutch and disengage the brake after the time interval.

The tire handling and spraying apparatus described above may further include a tire lift for receiving and lifting the tire towards the tiregrasping mechanism when it is in the load position to raise the tire to a raised position for being grasped by the tiregrasping mechanism. A first lift sensor detects the presence of the tire on the tire lift and generates a lift signal in response thereto, and the tire lift is responsive to the lift signal to lift the tire to the raise position. A second lift sensor generates a grasp signal when the tire lift is in the raised position and the tire grasping mechanism is responsive to the grasp signal to grasp the interior rim of the tire.

In accordance with a more particular embodiment of the present invention, the apparatus for handling and spraying a tire includes a center base and a vertical shaft rotatably mounted in the center base and extending upwardly therefrom. The apparatus also includes a main motor having an output and a rotary indexer that is connected to rotate the vertical shaft and is operable to selectively pause the rotation of the vertical shaft. A clutch is interconnected between the main motor and the rotary indexer for selectively engaging and disengaging the rotary indexer from the output of the main motor, and a brake selectively brakes the rotation of the vertical shaft. At least one arm extends generally horizontally outwardly from the vertical shaft and is connected to the vertical shaft for rotation therewith so that the rotary indexer is operable to selectively pause the rotation of the arm in at least a spray position. A grasp mechanism is mounted on the arm for selectively grasping and releasing the tire, and a spray mechanism is provided for spraying fluid on the tire when the arm is in a spray position. A rotation control system operates to engage the brake and disengage the clutch for a time interval when the rotary indexer pauses the rotation of the vertical shaft and the arm. The rotation control system reengages the clutch and disengages the brake after the time interval so that the rotation of the arm is stopped for the time interval whenever the rotary indexer causes a pause in the rotation of the arm.

The rotary indexer may also operate to pause the rotation of the arms in a load position, a spray position and a discharge position, and the grasp mechanism may be operable to selectively spin the tire about its center axis. In such apparatus, a load control system selectively actuates the grasp mechanism to grasp the tire when the arm and grasp mechanism are in the load position, and a spin control system actuates the grasp mechanism to spin the tire about its center axis when the arm and grasp mechanism are in the spray position. The spin control mechanism also selectively deactuates the grasp mechanism to stop it from spinning the tire. A discharge control mechanism actuates the grasp mechanism to release the tire when the arm is in the discharge position.

In the preferred embodiment, the spin control system includes switch mounted on the arm for controlling the grasp mechanism to selectively spin the tire. This switch is carried on the arm in a circular path about the center base. A first engagement surface is positioned in the path of the switch between the load position and the spray position of the arm and engages and actuates the switch to start and operate the grasp mechanism to spin the tire. A second engagement surface is positioned in the path of the switch between the spray position and the discharge position of the arm and engages the switch to deactuate the grasp mechanism to discontinue the spinning of the tire.

In accordance with another aspect of the present invention, a method for handling a tire with an interior rim and for spraying a liquid on the tire includes the following steps: A tire is positioned in a load position at a load station, and the tire is grasped at the load station and is translated through a circular path from the load station to a spray station. At the spray station, the tire is spun and sprayed with a fluid. The tire is then translated through a circular path to a discharge station and is released.

In accordance with a more particular aspect of the invention, the aforementioned steps of translating the tire through a circular path from the load station to the spray station and translating the tire through a circular path to a discharge station includes the operation of indexing the tire through a circular path of a pre-determined first distance from the load station to the spray station by accelerating the tire through the circular path for a pre-determined first subdistance, decelerating the tire through the circular path for a pre-determined second subdistance and pausing the circular motion of the tire at the spray station. The circular motion of the tire at the spray station is stopped for a selected time period. The tire is then indexed through a pre-determined second distance from the spray station to an idle station by accelerating the tire through the circular path for a pre-determined third subdistance, decelerating the tire through the circular path for a pre-determined fourth subdistance and pausing the circular motion of the tire at an idle station. The circular motion of the tire is then stopped at the idle station for the selected time period. The tire is then indexed through a third pre-determined distance from the idle position to the discharge position by accelerating the tire through the circular path for a pre-determined fifth subdistance decelerating the tire through the circular path for a pre-determined sixth subdistance and pausing the circular motion of the tire at the discharge position. The circular motion of the tire is stopped at the discharge position for the selected time period.

BRIEF DESCRIPTION OF THE DRAWINGS

The present invention may best be understood by reference to the following Detailed Description of the preferred embodiment of the invention when considered in conjunction with the accompanying Drawings in which:

FIG. 4 is a detailed view showing a pneumatic switch that is operated by a trailing lever and an inclined surface that operates to force the lever upwardly to turn the pneumatic switch on;

DETAILED DESCRIPTION

Figure 1:
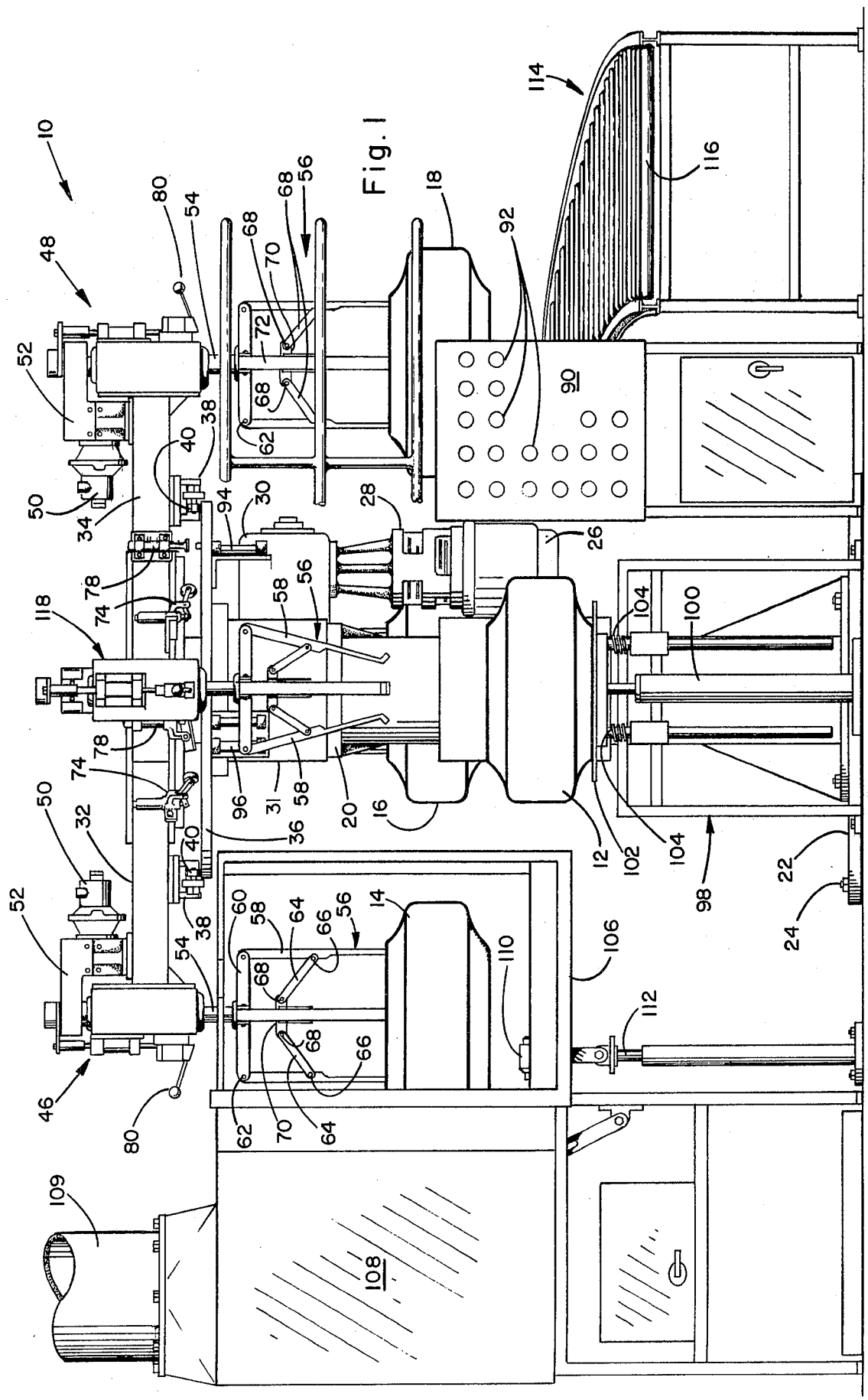
FIG. 1 is a somewhat diagramatical front view of a tire handling and spraying apparatus embodying the present invention.

Referring now to the drawings in which like reference characters designate like or corresponding parts throughout the several views, there is shown in FIG. 1 a tire handling and spraying apparatus 10 embodying the present invention. Apparatus 10 operates to move tires 12, 14, 16 and 18 through four work stations, a load station, a spray station, an idle station, and a discharge station. The tire 12 is shown in the load station, tire 14 in the spray station, tire 16 in the idle station, and the tire 18 in the discharge station. The primary function of apparatus 10 is to spray a lubricant on the interior of and paint on the exterior of the tires. The tires are picked up by the apparatus 10 at the load station and moved to the spray station when they are sprayed with paint and a lubricant. The tires then move to the idle station and are merely held in this station with no operation being performed. Next, the tires are moved to the discharge station, released and transported away from apparatus 10. Although the tires, such as tires 12, 14, 16, and 18 will be consistently referred to herein as "tires," it will be understood that the tires have not been entirely through the tire manufacturing process and, at this point in the manufacturing process, such tires are commonly referred to as green tires or green tire blanks. The apparatus 10 includes a center base 20 that is secured to a factory by a base plate 22. Conventional means, such as the nut and anchor bolt connection 24 are used to secure the plates 22 to the floor.

An explosion-proof motor 26 is mounted on the side of the base 20, and the output of the motor 26 drives the input of a clutch and brake 28. Motor 26 is a three horsepower, three phase, sixty hertz, 460 volt motor manufactured by Reliance and the clutch and brake 28 is a Horton model no. MD1125. The output of the clutch and brake 28 is connected to the input of a gear reduction unit 30, which is preferably model 7400C manufactured by Camco. The gear reduction unit 30 drives the input of a rotary indexer 31 which is preferably model no. 1300D4H64-300RH manufactured by Camco. The rotary indexer 31 has an output that is transmitted through a vertical shaft extending upwardly from the rotary indexer and is connected to rotate four radially extending arms 32, 33, 34 and 35 of which arms 32 and 34 that are shown in FIG. 1. The arms 32, 33, 34 and 35 rotate about a center axis of apparatus 10.

A circular support plate 36 is mounted on the center base 20 disposed immediately below the arms 32, 33, 34 and 35 in a spaced parallel relationship. Wheel support brackets 38 are mounted on the underside of each arm 32, 33, 34 and 35 with a steel wheel 40 mounted therein and being disposed for rolling on the perimeter of support plate 36. In this manner the arms 32, 33, 34 and 35 are vertically supported by plate 36.

Arm 32 has a head 46 mounted on the arm at a position distal from the center axis, and the distal end of the arm 34 has a like head 48 mounted thereon. Heads 46 and 48 are identical, and the remaining two arms 33 and 35 of apparatus 10 (not shown in FIG. 1) have similar identical heads 118 and 176 (see FIG. 3) mounted on the ends thereof. Each of the heads 46, 48, 118 and 176 have a pneumatic motor 50 mounted thereon and in the preferred embodiment, the motor 50 is a Gast model 4AM. A gear reduction system 52 is mounted on the head 46 and is driven by the motor 50. The output of the gear reduction system 52 rotates a head shaft 54 that extends downwardly from the head 46. A tiregrasping finger set 56 is mounted on the shaft 54 for rotation therewith. The detailed construction of the finger set 56 is conventional in nature and the parts thereof are manufactured by Plummer Spray Equipment, Inc. The finger set 56 includes a plurality of fingers 58 mounted at the top to a fixed cross-member 60. The fingers 58 are pivotally attached to the cross-member 60 by pivotal connector 62. A plurality of scissor arms 64 are connected to the approximate midsections of the fingers 58 by pivotal connectors 66, and the opposite ends of the scissor arms 64 are connected by pivot connectors 68 to a sliding cross member 70. The sliding cross member 70 is connected to cylindrical shaft 72 that extends upwardly into the head shaft 54 and the head 46 (or 48). Both the sliding cross member 70 and the shaft 72 are free to slide upwardly and downwardly through a pre-determined distance in order to move the fingers 58 inwardly and outwardly between an extended position and a retracted position. The fingers 58 as shown in the load station in FIG. 1 (adjacent tire 12) are shown in the retracted position, and the fingers 58 shown in the spray station (adjacent tire 14) and in the discharge sttion (adjacent tire 18) in FIG. 1 are positioned in the extended position.

The head 46 is operable to spin the finger set 56 and to move the finger set between the extended position and retracted position. A pneumatic switch 74 is mounted on arm 32 for actuating and deactuating motor 52 to selectively spin or discontinue the spinning of the finger set 56. Each arm 32, 33, 34 and 35 has a similar pneumatic switch 74 mounted on it to control the pneumatic motor 50 of the head mounted on such arm.

Each arm also has a separate pneumatic switch mounted thereon for controlling whether the finger set 56 is in the extended position or the retracted position. For example, pneumatic switch 78 mounted on arm 34 controls the head 48 to place the finger set 56 in the extended or the retracted position. Manual levers 80 are also provided on each of the heads, such as heads 46 or 48, for operating the finger set 56 between the extended position and retracted position.

In the preferred embodiment, the heads, such as heads 46 and 48 are operated pneumatically thus, a pneumatic motor 50 and a pneumatic cylinder within the head provide the mechanical power for the two operations of each head. Also, pneumatic switches 74 and 78 are provided to actuate and deactuate the pneumatic functions of the head. Pneumatic power was chosen in the preferred embodiment to minimize the danger of explosion when flammable liquids are used to spray the tire. However, it will be understood that when the apparatus 10 is designed for use with non-flammable liquids and sprays, the heads 46, 48, 118 and 176 could be designed to operate electrically. Also, hydraulic systems could be substituted for the pneumatic systems. In the preferred embodiment, a pneumatic power is supplied to the heads 46, 48, 118 and 176 by a pneumatic line disposed above the apparatus 10 and interconnected with pneumatic lines on the arms 32, 33, 34 and 35 by a rotary union 137 (see FIG. 3) that is positioned in the very center of the apparatus 10 on the center axis of rotation of the arms. Pneumatic lines extend between the rotary union 137, and the various pneumatic switches 74 and 78 and the heads 46, 48, 118 and 176. The pneumatic lines and connections are conventional in nature and design and are not shown in FIG. 1 for clarity of the illustration. It will be understood however that such pneumatic hoses do interconnect the various pneumatic devices of apparatus 10. All pneumatic devices above the support plate 36 on the rotating arms 32, 33, 34 and 35 are supplied with pneumatic power through the rotary union 137, while pneumatic devices below the support plate 36 are supplied by other pneumatic lines.

A push button control panel 90 is provided adjacent the load station of apparatus 10. The control panel 90 includes numerous push buttons 92, which enable an operator to control the operation of the apparatus 10. Also, pneumatic control logic is contained within the panel 90 for controlling the automatic operation of apparatus 10. The design of the panel 90 and the control logic contained therein is conventional. That is, while the method of controlling apparatus 10 and the method of handling and spraying tires as embodied in apparatus 10 are important aspects of the invention, the particular design of a control panel and the particular design of control logic to implement the method is not an important aspect of the invention and does not constitute part of the invention. It will be understood that while pneumatic controls and logic are used in the present invention, electrical controls and logic may be substituted if desired.

It will be appreciated that the portion of apparatus 10 above support plate 36 is pneumatically isolated from the pneumatic control panel 90. While pneumatic power is provided to the rotating parts of apparatus 10 above support plate 36 through a rotary union 137, there are no pneumatic control lines communicating directly with any of the pneumatic motors or cylinders mounted on the rotating arms 32, 33, 34 and 35. Control of the pneumatic functions on arms 32, 33, 34 and 35 is realized by mechanical connections. For example, the pneumatic switches 74 engage structures mounted on support plate 36 to actuate the switches as the arms 32, 33, 34 and 35 rotate. This operation is described in greater detail hereinafter.

A pneumatic cylinder and piston 94 is mounted below the wear plate 36 for engaging switch 78 when arm 34 is in the discharge position. Likewise a dual cylinder and piston set 96 is provided actuating or deactuating a pneumatic switch 78 when it is in the load position.

Continuing to refer to FIG. 1, the tire 12 is shown in the load position mounted on a tire lift 98 that is shown in its lowered position for receiving a tire. The tire lift 98 includes a pneumatic cylinder and piston 100 for raising the tire 12 upwardly to a raised position. There are two integral sensors located within the tire lift 98, one for detecting the weight of a tire 12 on the tire lift 98 and one for detecting when the cylinder and piston 100 have raised the tire 12 to a raised position. The sensors used for this function are conventional Mead MV-75 air pilot valves. In the preferred embodiment, the tire lift 98 includes a lift platform 102 that is raised by the cylinder and piston 100 and also rests on springs 103 that are coaxially disposed about sliding rods 104. When a tire is placed on the lift platform 102, the springs 103 are compressed and the platform 102 moves downwardly to actuate a pneumatic switch that actuates the pneumatic cylinder and piston 100 to raise the platform 102 to a raised position. When the platform 102 has been raised to the proper raised position and the cylinder and piston 100 is fully extended, a second pneumatic switch is actuated to stop further movement of lift platform 102 by the pneumatic cylinder and piston 100. When the tire 12 is grasped by the finger set 56, the logic of control panel 90 causes the cylinder and piston 100 to lower the platform 102 to again rest on springs 103.

Located to the left of the tire lift 98 is a spray booth 106 positioned immediately adjacent to an exhaust hood 108. An exhaust duct 109 extends from the top of hood 108 for evacuating the hood 108 during spraying operation. A spray nozzle 110 is located inside the spray booth 106 and is supported by a nozzle support cylinder and piston 112. When a tire, such as tire 14 enters the spray booth 106, the nozzle 110 is raised to spray the interior of the tire 14 and other nozzles, not shown in FIG. 1 spray the exterior of the tire 14.

Located to the right of the control panel 90 is a discharge conveyor table 114 constructed with a plurality of rollers 116 mounted in a spaced apart parallel relationship and disposed in an inclined plane so that tires, such as tire 18, when dropped on the discharge conveyor table will roll down the table 114 in the downward direction of the inclined plane of rollers 116.

Figure 3:
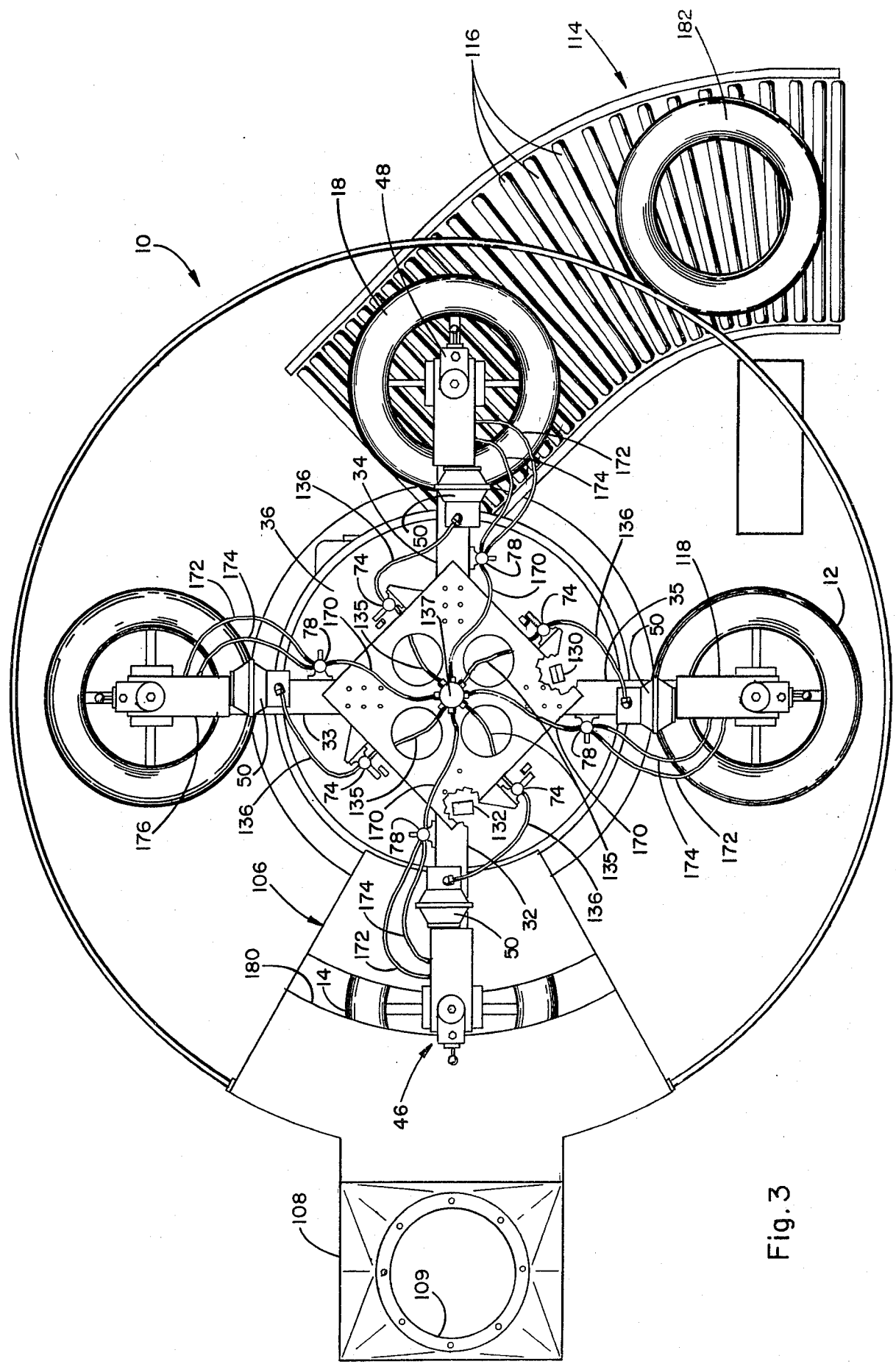
FIG. 3 is a top view or plan view of the tire handling and spray apparatus.

In operation, apparatus 10 is first enabled by an operator using control panel 90. In the start position, a head 118 is disposed in the load position while the head 46 is in the spray position and the head 48 is in the discharge position. A head 176, shown in FIG. 3, is in the idle position.

In order to begin proper operation, the finger set 56 disposed in the load position beneath head 118 is actuated so that the fingers 58 thereof will assume the retracted position as shown in FIG. 1. The finger set 56 beneath head 46 will be in the extended position as shown in FIG. 1 and this finger set as well as the shaft 54 should be rotating to spin the tire 14. The finger set 56 beneath the head 48 will not be spinning and can be in either the extended position as shown in FIG. 1 or a retracted position.

Assuming apparatus 10 is in condition to begin operation, the procedure is started by placing a tire, such as tire 12, on the tire lift 98. The weight of the tire 12 will lower platfrom 102, compress springs 103 and actuate a switch to power the cylinder and piston 100 to raise the lift platform 104 to a raised position. When the tire 12 reaches the raised position, the fingers 58 of the finger set 56 disposed in the load position will be within the rim of the tire 12.

Figure 2:
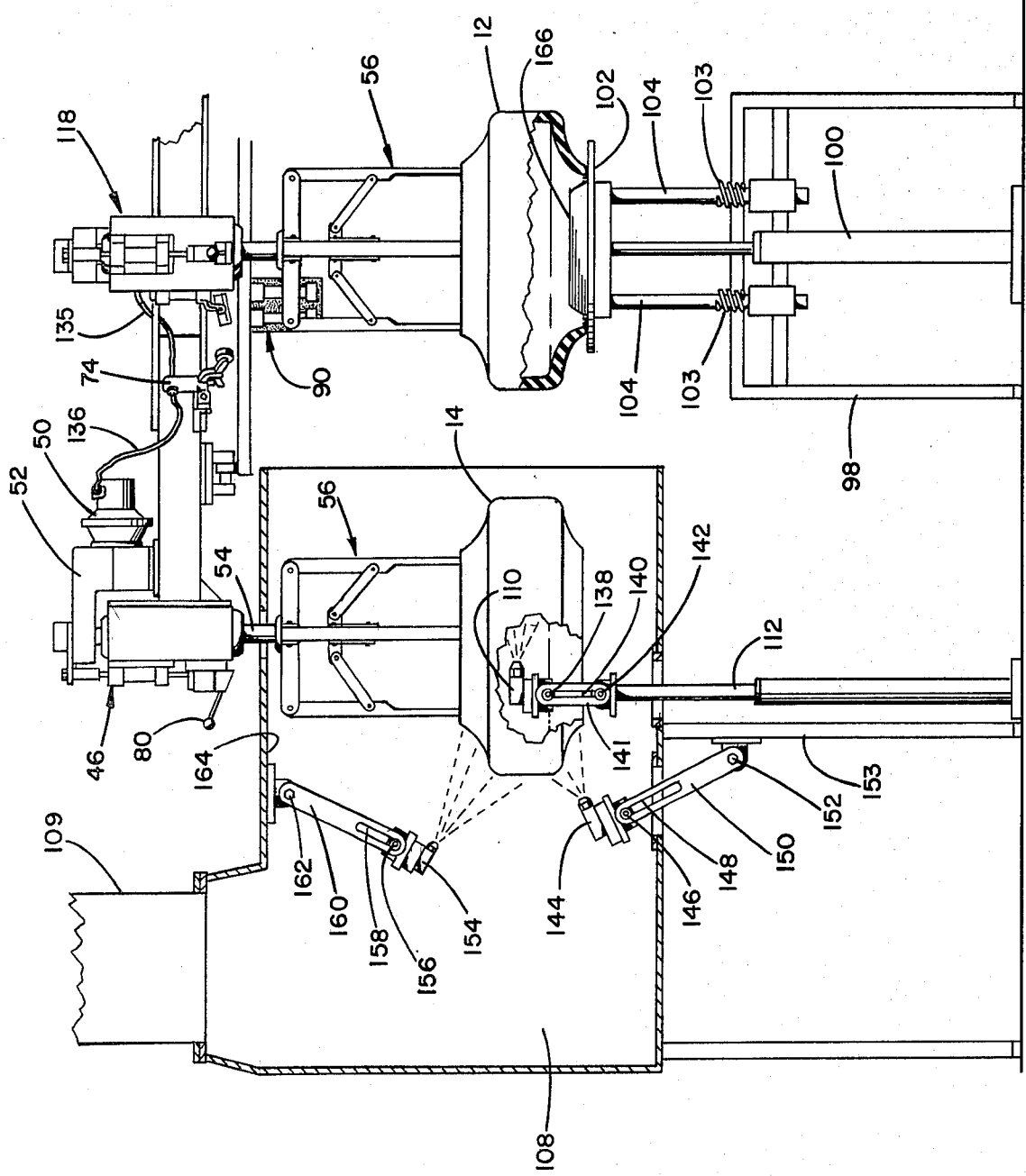
FIG. 2 is a front view of a portion of the tire handling and spraying apparatus showing portions thereof cut away to reveal spray apparatus.

When the platform 102 has reached the raised position as shown in FIG. 2, a second sensor, a pneumatic switch, will indicate to the control logic in panel 90 that the tire 12 is in position for being grasped by fingers 56. The control panel 90 will then actuate the cylinder and piston set 96 to engage the switch 78 that is located in the load position on arm 35. Switch 78, when actuated, will cause the sliding cross-member 70 to be forced downwardly and, thus, will force the finger set 56 into the extended position to grasp the interior rim of the tire 12. After the tire 12 has been secured on the finger set 56 of head 118, lift platform 102 returns to the lowered position as shown in FIG. 1.

The functions to be performed at the load station have now been completed and assuming the work at the remaining work stations has likewise been completed, the control logic of panel 90 will generate a pneumatic signal to engage the clutch and disengage the brake of the clutch and brake 28. Thus, the electric motor 26 begins to drive the gear reduction unit 30 which in turn drives the rotary indexer 31 to rotate the arms 32, 33, 34 and 35.

The rotary indexer 31 will rotate the arms 32, 33, 34 and 35 exactly 90 degrees and then pause the rotation of the arms. The arms 32, 33, 34 and 35 will be smoothly accelerated by the rotary indexer 31 for approximately the first 45 degrees of the rotation and will be decelerated for the second 45 degrees of the rotation so that the rotary indexer causes arm 35 and head 118 to pause after 90 degrees of rotation in the spray position. When the rotary indexer 31 causes the rotation to pause, it also generates a pause signal indicating to the control panel that a pause has occurred. In response to the pause signal, logic of the control panel 90 will generate a stop signal that will disengage the clutch and engage the brake of the clutch and brake 28 to hold the position of the arms 32, 33, 34 and 35 in the various stations.

The pause signal is generated by a pneumatic limit switch located at the input to the rotary indexer 31 (the output shaft of the gear reduction unit 30) and is positioned to indicate the position of arms. The limit switch switch interval to the rotary indexer 31 will generate a pause signal after the arm 32, 33, 34 and 35 have been rotated 90 degrees and have paused at the work stations.

Figure 4:
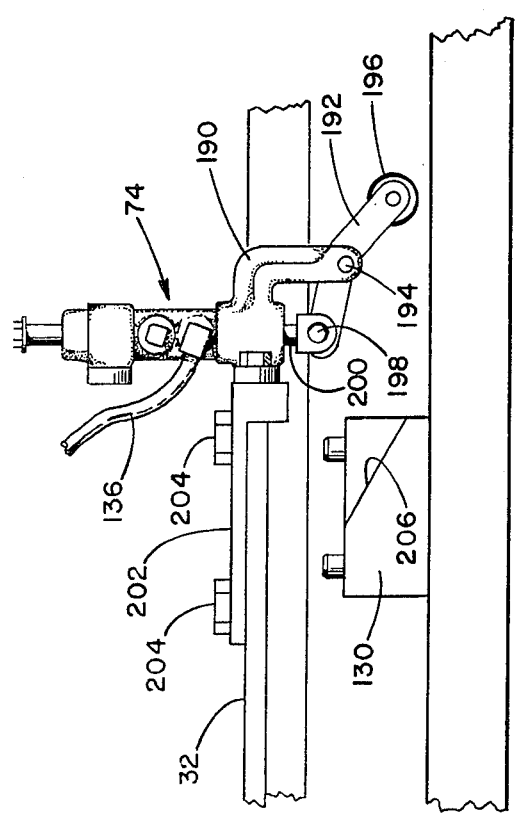

As the arm 35 moved from the load station to the spray station, a switch 74 on arm 35 engaged an engagement block 130 which is shown in FIGS. 3 and 4 to generate a pneumatic signal to actuate and supply pneumatic power to motor 50. Thus, in response to the actuation of switch 74, motor 50 begins to rotate the finger set 56 and spin the tire 12. When the tire 12 assumes the position of tire 14 as shown in FIG. 1, it will be spinning about its own center axis. When the pause signal has been generated by the rotary indexer 31, in addition to stopping rotation of the arms 32, 33, 34 and 35, the logic of control panel 90 will generate signals to begin work operations at the various work stations. Thus, the logic of control panel 90 will cause the nozzle support cylinder and piston 112 to raise nozzle 110 to a position within the tire 14 to begin the spraying operation. After a selected time interval, the logic of the control panel 90 will stop the spraying process and cause the nozzle support cylinder and piston 112 to lower the nozzle 110 down from within the tire 14. After the spraying process has been completed and the work to be performed at the other work stations has been completed, the control panel will again disengage the brake and engage the clutch of the clutch and brake 28 to cause the rotary indexer to rotate the arms 32, 33, 34 and 35 another 90 degrees. The tire at the spray station will then be moved to the position of tire 16 shown in FIG. 1 which is an idle position. No work is performed on the tire 16 in the idle position, and the tire merely pauses in this position to allow work to be performed at the other work stations.

Figure 5:
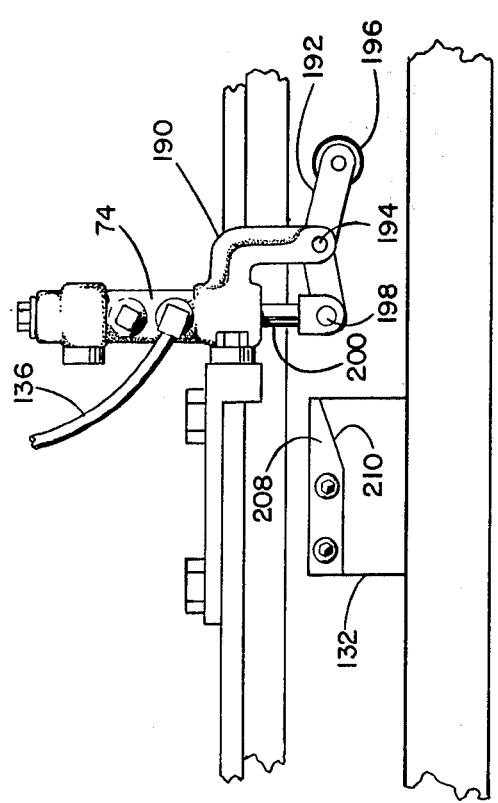
FIG. 5 is another view of the pneumatic switch and lever and a second inclined surface that engages the lever to turn the pneumatic switch off.

As an arm moves from the spray position as shown by arm 32 in FIG. 1 to the idle position as illustrated by arm 33 in FIG. 3, the switch 74 on such arm will engage an engagement block 132 as shown in FIGS. 3 and 5. This engagement will deactuate the switch 74 to terminate the pneumatic power supply to the motor 50 and, thus, discontinues the spinning of the tire 16 by the finger set 56. Thus, the tire 16 is not rotating when it is in the idle position.

When all work has been completed at the work stations, the logic of control panel 90 will again cause the clutch to engage and the brake to disengage the clutch and brake 28 and rotary indexer 31 will again rotate the arms 32, 33, 34 and 35 through a radial distance of 90 degrees. Thus, a tire in the idle station, such as tire 16 shown in FIG. 1, will be moved through a circular path to the discharge station as illustrated by tire 18 in FIG. 1. When the pause signal is generated by the rotary indexer 31, the control logic will generate a pneumatic signal to actuate the cylinder and piston 94 which will cause the piston thereof to actuate the switch 78 located on the arm that has assumed the position of arm 34 as shown in FIG. 1. Switch 78 when actuted by the cylinder and piston 94 will cause the finger set 56 of head 48 to move to the retracted position and drop the tire 118 onto the conveyor table 114. Because of the inclination angle of the table 114, the tire 18 will then roll down the table 116 to an operator for being loaded onto an appropriate carrier.

After all work has been completed, the logic of the control panel 90 will again cause the brake to disengage and the clutch to engage of the clutch and brake 28, and the rotary indexer 31 will rotate the arms 32, 33, 34 and 35 through a radial distance of 90 degrees. Thus, an arm in the discharge position, such as arm 34 shown in FIG. 1, will move to the load position as illustrated by arm 35 shown in FIG. 3. When the pause signal is generated by the rotary indexer, the control panel will cause the loading operation at the load station to begin again as previously described. Assuming a tire has been placed on the lift platform 102, when the pause signal is received by the control panel 90, it will generate a lift signal to cause the tire lift 98 to lift the tire 12 towards the finger set 56 of head 118, and when the tire 12 has been lifted to the proper raised position, control panel 90 will generate a signal to actuate the cylinder and piston set 96 to actuate switch 78 to cause the finger set 56 to grasp the tire 12, and the operation of apparatus will continue to cycle as previously described.

Referring now to FIG. 2, there is shown a portion of the tire handling and spraying apparatus 10 with sections thereof removed to illustrate the spraying operation. In this view, two pneumatic lines 135 and 136 have been shown with line 135 extending from the pneumatic power source, a rotary union 137 shown in FIG. 3. The pneumatic switch 74 is now in the on position and thus transmits pneumatic power through pneumatic line 136 to the motor 50. The motor 50 drives and rotates the finger set 56 through the gear reduction union 52.

As the tire 14 is spinning, the nozzle 110 sprays a lubricant into the interior of the tire. As shown in FIG. 2, the nozzle 110 has been lifted by the nozzle support cylinder and piston 112. The nozzle 110 is pivotably and slidably mounted on a nozzle arm 141 by a nut and bolt connection 138 that extends through a slot 140 and clamps against the nozzle arm 141. At its lower end, the nozzle arm 141 is pivotally connected to the top of the nozzle support cylinder and piston 112 by a nut and bolt connection 142.

By adjusting the pivotal connection 138, the height and inclination angle of the nozzle 110 may be adjusted. The lateral position of the nozzle may be adjusted to some degree by rotating the nozzle arm 141 about the nut and bolt connection 142.

A second nozzle 144 is provided for spraying a paint on the exterior of the tire 14. A nut and bolt connection 146 extends through a slot 148 and clamps against the upper portion of a nozzle arm 150 to mount the nozzle 144 on the top of the arm 150. The lower portion of the arm 150 is pivotally connected by a nut and bolt connection 152 to wall 153. A third nozzle 154 is provided for spraying a paint on the upper exterior of the tire 14. Nozzle 154 is mounted by a nut and bolt connection 156 through a slot 158 in the lower end of a nozzle arm 160. The upper end of arm 160 is pivotally connected by a nut and bolt connection 162 to a top wall 164 of the exhaust chamber 180. Thus, as the tire 14 spins, nozzles 144 and 154 paint the exterior of the tire while nozzle 110 sprays a lubricant into the interior of the tire.

In FIG. 2, the tire lift 98 is shown with the lift platform 102 in the fully raised position. Also, the tire 12 is shown in a cross section view to reveal an alignment flange 166 extending upwardly from the upper surface of the lift platform 102. The alignment flange is circular in shape and has a lower base diameter that is approximately equal to the interior diameter of the rim of tire 12. The upper top diameter of flange 166 is significantly less than the diameter of the rim of tire 12 so that the flange 166 may be easily inserted within the rim of tire 12 and will align the tire 12 on the platform 102.

When the lift platform 102 is in the fully raised position, the platform is lifted off a pair of springs 103 that are disposed coaxially about the rods 104. The rods 104 serve as guides for the platform 102 as the cylinder and piston 100 lifts and lowers platform 102.

Referring now to FIG. 3, there is shown a top plan view of apparatus 10. In this view, the pneumatic lines feeding from the rotary union 137 are shown, but no supply pneumatic line to the rotary union 137 is shown. However, it will be understood that a supply line does extend to the center of the rotary union 137.

Pneumatic lines 134 extend from the rotary union 137 to the supply side of switches 74. The pneumatic lines 136 supply pneumatic power from the switch 74 to the motors 50. When the switch 74 is on, the pneumatic supply to the motors 50 is on. When switch 74 is off, the motors are not powered and are off.

Pneumatic lines 170 extend from the rotary union 137 to the switches 78. Two pneumatic lines 172 and 174 extend from each of the switches 78 to each of the four heads 46, 48, 118 and 176. The pneumatic lines 172 and 174 supply a pneumatic power to a piston within the heads to control the position of the finger sets 56. When a line 172 is pressurized, the corresponding finger set 56 is forced into the extended position and when pneumatic line 174 is pressurized, the finger set 56 is forced into and held in the retracted position.

The operation of the switches 74 to turn the motors 50 on and off is easily understood by reference to FIG. 3. As shown in FIG. 3, the arm 32 is in the spray position. When the spray cycle is over and the arm 32 moves towards the idle position in a clockwise direction as shown in FIG. 3, the switch 74 disposed behind or trailing arm 32 will engage the block 132 to switch off the pneumatic power supply to the motor 50.

In FIG. 3, arm 35 is shown in the load position. When arm 35 leaves the load position and begins to move towards the spray position, the switch 74 that is behind or trailing arm 35 engages the block 130 to turn switch 74 on and supply pneumatic power to the motor 50. Thus, the actuation of the switch 74 by the inclined surface block 130 causes the tire 12 to begin spinning.

Also, in FIG. 3 it is clearly shown that a slot 180 is formed in the top of the spray chamber 106. The shaft 54 extends through the slot 180, as shown in FIG. 2, to support the tire 14 within the spray chamber.

A tire 182 is shown rolling down the conveyor table 114. When a tire in the position of tire 18 in FIG. 3 is dropped from the head 48, it will land on the conveyor table rollers 116 and, because of the inclination of the table, will roll down the table towards the position of the tire 82. An operator will then remove the tire 82 from the conveyor table and load it onto on to appropriate carriers.

Continuing reference to FIG. 3, it will be appreciated that a wear strip 184 is secured to the upper perimeter of the support plate 36. This wear strip is constructed of a hardened metal designed to minimize and resist wear caused by steel wheel 40 rolling along the perimeter of the support plate 36.

Referring now to FIG. 4 there is shown a detailed view of the switch 74 and of the engagement block 130. The switch 74 includes a support elbow 190 extending therefrom with a lever 192 pivotally mounted thereon by a pivot pin 194. On the lower end of the lever 192, there is mounted a roller 196. The upper end of the lever 192 is pivotally connected by a pin 198 to a plunger 200 extending from the switch 74. The plunger 200 when moved downwardly will turn the switch "on" and when moved upwardly will turn it "off". The switch 74 is mounted on an arm, such as arm 32, by a flange 202 and bolts 204.

The engagement block 130 includes an inclined surface 206 disposed in the circular path of a switch 74. As the switch 74 moves forward in its circular path towards the engagement block 130, the roller 96 will engage the inclined surface 206 and roll up the surface. In this manner, the lower end of the lever 192 is forced upwardly causing the lever 192 to rotate about the pin 194 and pull the plunger 200 downwardly to turn switch 74 to an "on" position. In this manner, pneumatic pressure is transmitted through the switch 74 to the pneumatic line 136.

The switch 74 is shown in the "on" position in FIG. 5, and a second engagement block 132 is shown disposed in the circular motion path of the switch 74. The engagement block 132 has a projection 208 extending laterally therefrom with an inclined surface 210 formed on the underside of the projection 208. As the switch 74 moves forward toward the engagement block 132, the roller 196 will engage the inclined surface 210 and will be forced downwardly thereby. The downward motion of the roller 196 will force the opposite end of the lever 192 upwardly and will force the plunger 200 in an upward direction to turn the switch 74 "off" so that the pneumatic line 136 will be depressurized.

Figure 6:
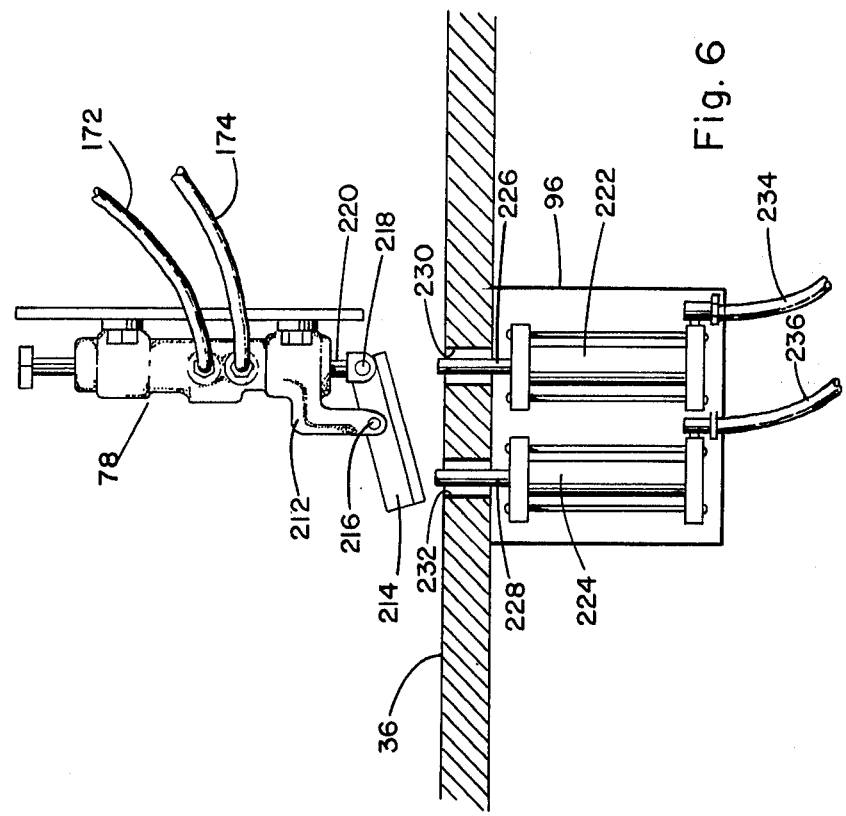
FIG. 6 is a detailed view of another pneumatic switch and a pair of cylinders and pistons that operate to turn the pneumatic switch on and off.

Referring now to FIG. 6, there is shown a detailed view of the switch 78 and the cylinder and piston set 96. In FIG. 6, the switch 78 and set 96 are positioned as if the switch 78 were mounted on an arm, such as arm 35, that was disposed in the load position. Switch 78 includes a support elbow 212 with a lever 214 pivotally mounted thereon by a pin 216. At one end of the lever 214, a pin 218 connects the lever 214 to a plunger 220 extending downwardly from the pneumatic switch 78. When the plunger 220 is in the retracted position as shown in FIG. 6, line 172 is pressurized, and when the plunger 220 is pulled downwardly to an extended position, line 174 is pressurized and line 172 is depressurized.

The cylinder and piston set 96 includes cylinders 222 and 224 with pistons 226 and 228 extending, respectively, therefrom. The pistons 226 and 228 extend through apertures 230 and 232 in the support plate 36. Pneumatic pressure is supplied to piston 222 by a pneumatic line 234 and a pneumatic line 236 supplies pneumatic power to the cylinder 224. In FIG. 6, the switch 78 is in the position as if the piston 226 had just previously been actuated and forced upwardly by the cylinder 222 to engage the lever 214 and force the plunger 220 into the switch 78. The actuation of the cylinder 222 and piston 226 is the standard function performed at the load station of apparatus 10, and this function is performed automatically by the logic contained in panel 90. However, if it is desired to pressurize line 174 and depressurize line 172, the cylinder 224 may be manually actuated to force the piston 228 against the distal end of the lever 214 causing the plunger 220 to be pulled downwardly from the switch 78 into an extended position to pressurize line 174 and depressurize line 172. In this manner, the operator may manually return the finger set 56 to a retracted position.

The cylinder and piston set 94 may be identical to the piston set 96. However, in the preferred embodiment, the cylinder and piston set 94 is but one cylinder and piston mounted in a position for engaging the distal end of the lever 214 so that when the cylinder and piston set 94 is actuated, the piston thereof will engage the distal end of the lever 214 to pressurize pneumatic line 174 and depressurize pneumatic line 172 and, thus, to cause the corresponding finger sets 56 to move to a retracted position and release the tire 18 at the discharge station.

Figure 7:
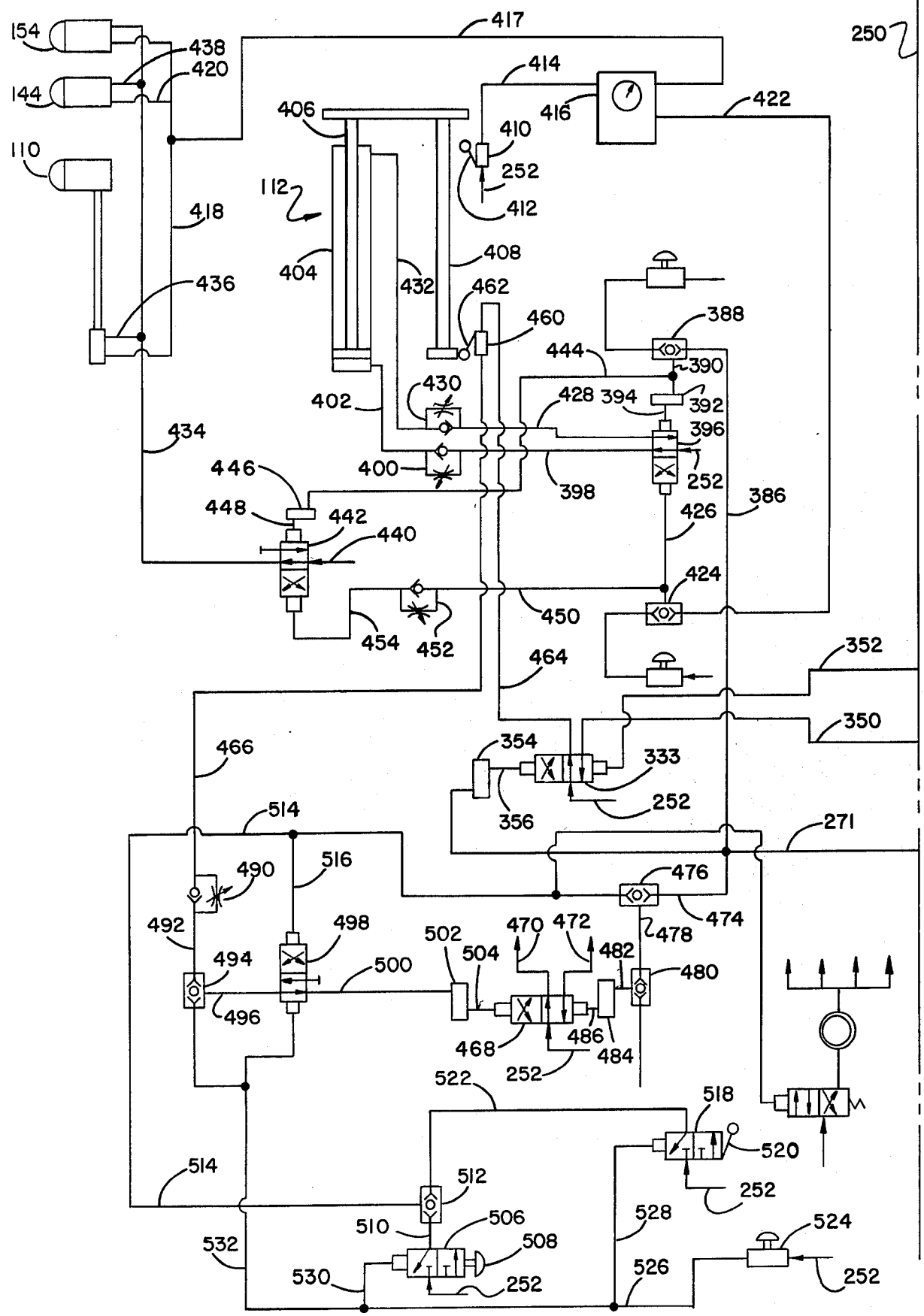
FIGS. 7 and 8 are schematic diagrams of the pneumatic control system.
Figure 8:
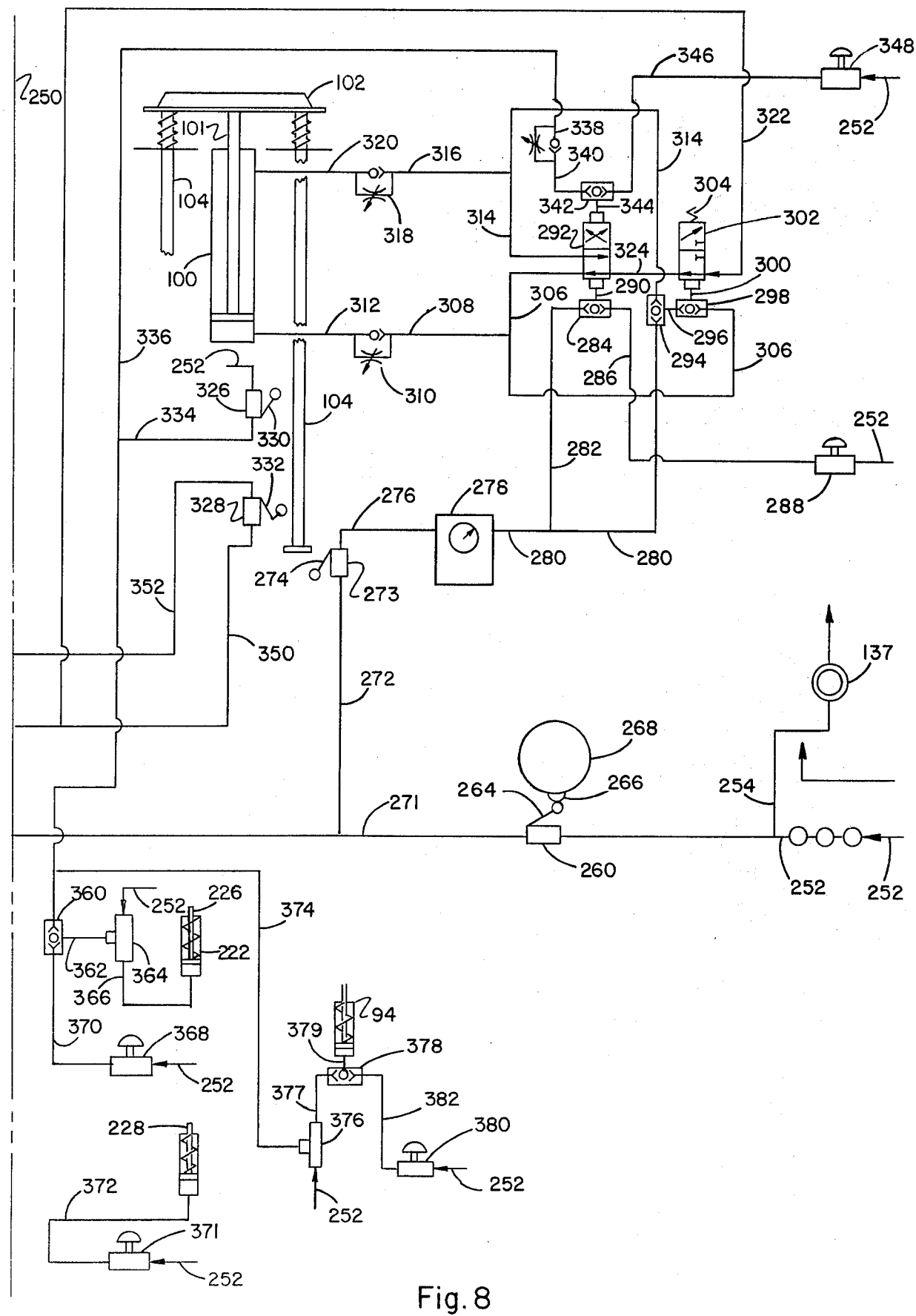

In FIGS. 7 and 8, there is shown a schematic diagram of the pneumatic system that controls the tire lift platform 102, the spray nozzles 144, 110 and 154 and the clutch and brake 28. FIGS. 7 and 8 each include a dashed match line 250 illustrating the line along which FIGS. 6 and 8 may be placed together to disclose the overall pneumatic system.

Referring now to FIGS. 7 and 8 together, there is shown at the left side of FIG. 8, a pneumatic line 252 that supplies pneumatic air or plant air to the system. Pneumatic line 252 feeds pneumatic line 254 that is connected to the input side of a rotary union 137 which is also shown in FIG. 3. The rotary union 137 supplies compressed air to all motors and pistons and cylinders above support plate 36. Pneumatic line 252 also supplies compressed air to the input side of a switch valve 260 that is switched between "on" and "off" positions by a lever 264. The lever 264 engages an indexer shaft 268 that includes a lobe 266 on the surface of the shaft. When the finger sets 56 (FIG. 1) are positioned properly in the four work stations, the lobe 266 will engage the lever 264 and switch the valve 260 "on" so that the compressed air from line 252 passes through valve 260 into pneumatic lines 271 and 272 to the input of a switch valve 273.

Switch valve 273 is switched between "on" and "off" modes by a lever 274 which is positioned in the path of a rod 104 that extends downwardly from the left platform 102. When a tire is placed on the lift platform 102, the platform is pressed downwardly, and the rod 104 engages lever 274 to place the switch valve 273 in the "on" mode and allow compressed air through the valve.

The output of valve 273 is connected through pneumatic line 276 to the input of a timed valve 278. Upon sensing compressed air at its input, the timed valve 278 will delay for a predetermined period and then open to allow the compressed air through the valve 278. The output of the timed valve 278 is connected through pneumatic lines 280 and 282 to one input of a shuttle valve 284. Shuttle valve 284 has another input connected to a pneumatic line 286 which is connected through a manual valve 288 to the plant air on pneumatic line 252. The shuttle valve 284 has an output connected through a pneumatic line 290 to actuate a fourway flow control valve 292. When compressed air appears at the output of the shuttle valve 284, the fourway valve 292 is actuated to the position shown in FIG. 8. Thus, the shuttle valve functions as a dual input for the actuation of the fourway valve 292.

When compressed air appears on pneumatic line 282, shuttle valve 284 will shuttle the air through the valve 284 to line 290 and will block its other input to line 286. Likewise, when the other input of the shuttle valve 284 receives compressed air through pneumatic line 286, the shuttle valve will transmit such compressed air through to line 290 and will block line 282 so that compressed air is not lost back into the system through line 282. Pneumatic line 280 is also connected to the input of a shuttle valve 294 whose output is connected through pneumatic line 296 to the input of another shuttle valve 298. The input of shuttle valve 298 is connected through pneumatic line 300 to actuate the fourway flow control valve 302. When compressed air appears in line 300, valve 302 is actuated to the position shown in FIG. 8. Otherwise a spring 304 forces the fourway valve 302 downwardly from the position of the valves in FIG. 8.

The other input of shuttle valve 298 is connected through pneumatic line 306 to an output of the fourway valve 292. The same outputs of the fourway valve 292 is connected through pneumatic lines 306 and 308, an orifice 310 and a pneumatic line 312 to a lower input of the cylinder 100. When compressed air appears in line 312, a piston 101 of the cylinder and piston 100 is forced upwardly. Another output of the fourway valve 292 is connected through line 314, line 316, orifice 318 and line 320 to an upper input of the cylinder and piston 100. When compressed air appears in line 320, the piston 101 is forced downwardly.

Pneumatic line 314 is also connected as an input to the shuttle valve 294 for selectively acutating the fourway valve 302 through line 296, valve 298 and line 300. The fourway valve 302 receives its input from the plant air on pneumatic line 252 through pneumatic line 322 and a fourway flow control valve 333.

Referring now to the immediate left of rod 104, there is shown two switch valves 326 and 328 that are switched "on" and "off" by a lever 330 and a hinged lever 332, respectively. The input of switch valve 326 is connected to the plant air by line 252, and the output of valve 326 is connected by line 334, line 336, orifice 338, and line 340 to an input of a shuttle valve 342. The output of shuttle valve 342 is connected through pneumatic line 344 to actuate the fourway valve 292. When compressed air appears on line 344, valve 292 is forced downwardly from the position shown in FIG. 8. The other input of shuttle valve 342 is connected through line 346 and a manual switch valve 348 to the plant air on pneumatic line 252.

Referring again to switch valve 328, the input thereof is connected through pneumatic line 350 and the fourway valve 333 to the plant air on line 252. The output of switch valve 328 is connected through line 352 to actuate the fourway valve 333. When compressed air appears on line 352, the valve 333 is actuated into the position as shown in FIG. 7.

Pneumatic line 271 is connected through a one shot 354 and pneumatic line 356 to actuate the fourway valve 333. When compressed air appears on line 271, a pulse of air is provided by the one shot 354 through line 356 to actuate valve 333 so that it moves to the right from the position as shown in FIG. 7.

Having thus described a portion of the pneumatic control system, the operation of the lift platform 102 may be described. Assuming that lobe 266 has engaged lever 264, compressed air will appear on lines 271 and 272, and the one shot 354 will actuate the fourway valve 333 to move to the right. The plant air will then be supplied from the fourway valve 333 to the pneumatic line 352.

When a tire is placed on the platform 102, the rod 104 moves downwardly and engages lever 274 switching the valve 273 "on". Compressed air enters line 276 and causes the timed valve 278 to begin timing. After a predetermined time interval, valve 278 will switch "on" and compressed air will enter line 280 to actuate the fourway valves 292 and 302 into the positions as they are presently shown in FIG. 8.

As previously mentioned, compressed air is also now appearing on lines 350 and 322 and will be transmitted through valve 302, line 324, line 306, line 308, orifice 310 and line 312 to the lower input of the cylinder and piston 100. Thus, the piston 101 will begin to rise when switch valve 273 is turned "on". Compressed air will also be supplied through line 306 to the other input of shuttle valve 228 which will supply compressed air to line 300. In this configuration, a loop is formed whereby the compressed air from line 322 will maintain the actuation of the fourway valve 302.

As piston 101 rises, rod 104 likewise rises and engages hinged lever 332. When rod 104 is in its upward motion, the hinging action of lever 332 allows rod 104 to pass without actuating switch valve 328. As rod 104 continues to rise, it engages lever 330 and switches switch valve 326 into an "on" mode, thus, pressurizing line 334 and 336. Then, compressed air flows through the orifice 338, through line 340, through shuttle valve 342, and through line 344 to actuate the fourway valve 292 so that it moves downwardly from the position shown in FIG. 8.

When valve 292 is thus actuated, the compressed air in line 324 is no longer transmitted to line 306, but instead, it is transmitted to line 314 and from line 314 it is transmitted through line 316, orifice 318 and line 320 to the upper input of the cylinder and piston 100. Thus, when the switch of valve 326 is actuated, line 312 is depressurized and line 320 is pressurized so that the piston 101 is forced downwardly. When line 306 was depressurized, the actuating force on the fourway valve 302 would have been lost but for the fact that line 314 was pressurized and through shuttle valve 294, line 296 and shuttle valve 298 provided pressure to line 300 to continue the actuation of the fourway valve 302.

As rod 104 continues its downward travel, it will eventually engage lever 332 and actuate switch valve 328. When this occurs, pressure will appear on line 352 and actuate the fourway valve 333 so that line 350 will be disconnected from the plant air. When line 350 is thus disconnected, pressure will be lost on lines 322, 324, 314, 316 and 320. Thus, the piston 101 will no longer be forced downwardly. Also, when the pressure on line 314 was lost, the actuation pressure on line 300 was lost as well, and the spring 304 will force the fourway switch downwardly as shown in FIG. 8, thus, cutting off the connection between line 322 and line 324.

Referring to the lower left side of FIG. 8, there is shown a set of cylinders 222 and 224 with pistons 226 and 228 extending, respectively, therefrom. The cylinder 222 and piston 226 is controlled by the switch valve 326. The output of switch valve 326 is transmitted through line 334, line 336, shuttle valve 360 and line 362 to actuate a valve 364 to an "on" position. The input to valve 364 is the plant air supplied by pneumatic line 252, and the valve is normally in the "off" position. The output of valve 364 is connected by a pneumatic line 366 to the cylinder 222.

When the lift platform 102 is raised to its fully extended position, and switch valve 326 is actuated by the rod 104, lines 334, 336, and 362 are pressurized, thus, actuating switch valve 364 to the "on" position and pressurizing line 366 causing the piston 226 in cylinder 222 to rise and actuate the fingerset 56 to expand and grasp a tire. The cylinder 222 and piston 226 may also be actuated using a manual switch valve 368 that connects the plant air on line 252 to the other input of the shuttle valve 360 through a pneumatic line 370.

The cylinder 224 and piston 228 may be manually actuated using switch valve 371. This switch valve 371 interconnects the plant air with line 252 and the cylinder 224 through a pneumatic line 372. The cylinder 224 and piston 228 are actuated when it is desired to contract fingerset 56 while it is in the load position.

The switch valve 326 also controls the operation of the cylinder and piston 94. The output of valve 326 is connected through line 334, line 336 and line 374 to actuate a valve 376 to an "on" position. Valve 376 is normally in the "off" position, and its input is connected to the plant air on line 252. The output of valve 376 is connected through line 377, shuttle valve 378 and line 379 to acutate the cylinder and piston set 94. Thus, when switch valve 326 is actuated, the cylinder and piston set 94 is also actuated which will cause the fingerset 56 in the discharge position to retract to release a tire.

The cylinder and piston set 94 may also be actuated by a manual valve 380. Valve 380 has its input connected to the plant air on pneumatic line 252 and has its output connected through a pneumatic line 382 to other input of the shuttle valve 378.

Referring now to the upper portion of FIG. 7, there is shown a pneumatic line 386 that interconnects line 271 with the input of a shuttle valve 388. The output of valve 388 is connected through line 390 to actuate a one shot 392 which creates a pulse of compressed air on line 394 in response to the presence of pressure on line 390. Line 394 is connected to actuate a four way valve 396 so that the one shot 392 will create a pulse to actuate a four way valve 396 into the position shown in FIG. 7. Thus, when the switch valve 260 is actuated to an "on" positon, lines 271, 386 and 390 will be pressurized causing the one shot 392 to actuate valve 396 into the position shown in FIG. 7. The input to valve 396 is the plant air on line 252.

When in a position as shown in FIG. 7, the output of the fourway valve 396 is applied through a pneumatic line 398, an orifice 400 and a line 402 to a lower input of the cylinder and piston set 112. The cylinder and piston set 112 includes a cylinder 404 and a piston 406. When line 402 is pressurized, the piston 406 is forced upwardly within the cylinder 404. The piston 406 includes a control rod 408 that rises and falls with the piston 406. As hereinbefore discussed, the spray nozzle 110 is mounted on the top of the piston 406, but for purposes of clarity in this schematic diagram, nozzle 110 is shown in a position separated from the cylinder and piston set 112.

A switch valve 410 controlled by a lever 412 is disposed in the path of the control rod 408. When piston 406 is in its fully raised position, rod 408 engages lever 412 and switches valve 410 into an "on" mode. The input of valve 410 is connected to the plant air on line 252, and the output is connected through a pneumatic line 414 to the input of a timed valve 416.

When the pressure first appears on line 414, the timed valve 416 will immediately apply the compressed air through pneumatic lines 417, 418, and 420 to the spray nozzles 110, 144 and 154, and valve 416 will begin timing. At the end of a predetermined time interval, the timed valve 416 will block the flow of compressed air to line 417 and will direct the compressed air to flow through line 422.

Line 422 is connected to the input of a shuttle valve 424 whose output is connected through line 426 to actuate the fourway valve 396 upwardly from the position shown in FIG. 7. When the valve 396 is thus actuated, the output of valve 396 is applied through pneumatic line 428, orifice 430 and pneumatic line 432 to an upper input in the cylinder 404 and will force the piston 406 downwardly. Atomization air is supplied to each of the spray nozzles 110, 144 and 154 by pneumatic lines 434, 436 and 438. The atomization air is supplied by an atomization air source on line 440 and is applied to line to 434 through a four way valve of 442. When pressure appeared on line 271 to begin the spraying process, line 390 was pressurized which, in turn, pressurized a line 444 connected between line 390 and one shot 446. When pressure appeared on line 444, the one shot 446 applied a pressure pulse on pneumatic line 448 which is connected to actuate the four way valve 442 into the position as shown in FIG. 7. Thus, the atomization air on line 440 was applied through the four way valve 442 to the line 434.

After the timed valve 416 timed out, lines 442 and 426 were pressurized. Line 426 is connected through pneumatic line 450, orifice 452, and pneumatic line 454 to actuate the four way valve 442 upwardly from the position as shown in FIG. 7. When valve 442 is thus actuated, the atomization air source on line 440 is blocked, and line 434 is depressurized.

After the spraying process has been completed, piston 406 and control rod 408 will return to their lowermost position. A switch valve 460 is disposed in the path of rod 408 and is switched between "on" and "off" positions by a lever 462. When the rod 408 is in its lowermost position, rod 408 depresses lever 462 and actuates valve 460 in the "on" position. The input of valve 460 is connected by a pneumatic line 464 to an output of the fourway valve 333. Assuming the tire loading function has been completed, and that the lift platform 102 has returned to its lowered position, the fourway valve 333 will have been actuated to the position as shown in FIG. 7. Thus, the plant air from line 252 will be applied through the fourway valve 333 and through line 464 to the input of valve 460. The output of valve 460 is connected to a pneumatic line 466 and, thus, line 466 will be pressurized when both the tire loading function and the spraying function have been completed.

Referring now to the lower portion of FIG. 7, there is shown a fourway valve 468 that controls the operation of the clutch and brake 28 shown in FIG. 1. Valve 468 has two outputs, one on pneumatic line 470 and the other on line 472. When line 470 is pressurized, the clutch is disengaged and the brake is engaged so that power is not transmitted from the motor 26 (shown in FIG. 1) to the rotary indexer 31. When line 472 is pressurized, the clutch is engaged and the brake is disengaged so that the rotary indexer 31 is driven by motor 26. The input of the fourway valve 468 is connected to the plant air on line 252 and, thus, one, but not both, line 470 or line 472 is pressurized at all times.

When switch valve 260 is actuated by the lobe 266 on the indexer shaft 268, line 271 is pressurized. Line 271 is connected through line 474, shuttle valve 476, line 478, shuttle valve 480, and line 482 to the input of a one shot 484. When line 271 is pressurized, the one shot 484 generates a pulse on line 486 to actuate the four way valve 468 to the position as shown in FIG. 7. Thus, when line 271 is initially pressurized, line 470 is pressurized to disengage the clutch and engage the brake to stop the rotation of the rotary indexer shaft 268.

As previously described, line 466 will be pressurized after the loading operation of the tires on platform 102 has been completed and after the spraying operation has been completed. Pneumatic line 466 is connected through an orifice 490, a line 492, a shuttle valve 494, and a line 496 to the input of a fourway valve 498. Assuming the fourway valve 498 is in a position shown in FIG. 7, the output of the valve 498 is applied through a pneumatic line 500 to the input of a one shot 502. In response to the appearance of pressure on line 500, the one shot 502 generates a pressure pulse on line 504 and actuates valve 468 to move to the right from the position shown in FIG. 7 so that line 472 is connected through the valve 468 to the plant air on line 252 and is pressurized while line 470 is depressurized. Thus, after the spraying and loading operations have been completed, pressure will appear on line 466 which will actuate valve 468 so that the brake is disengaged and the clutch is reengaged to reconnect the motor 26 to the rotary indexer 30, and rotation thereof will begin again.

In the lower portion of FIG. 7, there is shown a four way valve 506 that operates as an emergency stop valve. A button 508 is disposed on the right side of the valve 506, as shown, in FIG. 7 and when button 508 is depressed, the valve 506 moves to the left of the position shown in FIG. 7. The input of valve 506 is connected to the plant air on line 252. Normally, valve 506 simply blocks the plant air on line 252. When button 508 is depressed, however, the plant air 252 is transmitted through the valve 506 to pressurize line 510. Line 510 is connected through shuttle valve 512, line 514 and line 516 to actuate valve 498 to move downwardly from the position shown in FIG. 7. When valve 498 is thus actuated, line 496 is blocked and line 500 is depressurized. Line 541 is also connected to one input of the shuttle valve 476 whose output is connected to line 478 as previously described. Thus, when line 514 is pressurized, the one shot 484 is actuated to create a pulse on line 486 and actuate the fourway valve 468 into the position shown in FIG. 7. In this manner, the clutch is disengaged and the brake is engaged of clutch and brake 28. Rotational movement of the indexer shaft 268 is, thus, stopped.

Referring again to the lower portion of FIG. 7, there is shown a fourway valve 518 that operates as a safety valve. The input of valve 518 is connected to the plant air on line 252, and normally valve 518 simply blocks the air from line 252. A lever 520 is connected to actuate the valve 518, and when actuated by the lever 520, the valve 518 moves to the left of the position shown in FIG. 7 and connects the plant air on line 252 to a pneumatic line 522 that is connected to the output of valve 518. Line 522 is connected to the other input of shuttle valve 512 and, when line 522 is pressurized, it will cause the brake to engage and the clutch to disengage as previously described with respect to the emergency stop valve 506.

Shown in FIG. 7 immediately below the safety valve 518 is a reset button valve 524. The input of valve 524 is connected to plant air on line 252 and the output is connected to a pneumatic line 526. When the reset button valve is depressed, the plant air is transmitted through valve 524, line 526 and line 528 to actuate the safety valve 518 into the position as shown in FIG. 7.

The pressure from the reset button valve 524 is also applied through line 526 and line 530 to actuate the emergency stop valve 506 to the position shown in FIG. 7. Finally, the reset button valve 524 is connected through line 526 and line 532 to actuate the fourway valve 498 into the position shown in FIG. 7. In this manner, the rest button will enable the pneumatic system thus described to again disengage the brake and engage the clutch of the clutch and brake 28.

This pneumatic system as shown in FIGS. 7 and 8, is one of many that could be devised to perform basically the same function. Also, refinements of the system are possible which could include additional functions. Although a particular embodiment of the spraying apparatus 10 has been described in the foregoing Detailed Description, it will be understood that the invention is capable of numerous modifications, rearrangements and substitution of parts without departing from the scope of the invention.

I claim:

1. An apparatus for handling a tire with an interior rim and spraying a fluid on the tire, comprising;
    a rotatable center stand having a center axis about which said center stand is rotatable;
    at least one rotatable head mounted on said center stand and having a head axis about which said head is rotatable;
    at least one tire grasping means extending from said head for selectively grasping and releasing the interior rim of the tire and being operable to rotate in unison with said head to selectively spin the tire;
    stand drive means for selectively rotating said center stand to move said head and tire grasping means in a circular path about the center axis and for selectively stopping the rotation of said center stand in at least three positions to stop said head and tire grasping means in a load position, a spray position and a discharge position;
    head drive means mounted on said center stand for selectively rotating said head to rotate said tire grasping means;
    first actuating means for actuating said tire grasping means to grasp the interior rim of the tire when said head and said tire grasping means are stopped in the load position;
    second actuating means for actuating said head drive means to rotate said head about said head axis to rotate said tire grasping means and spin the tire when said head is in the spray position;
    third actuating means for actuating said tire grasping means to release the interior rim of the tire when said head is in the discharge position; and
    means for spraying fluid on the tire when said head, tire grasping means and tire are in the spray position.

2. The apparatus of claim 1 wherein said stand drive means comprises:
    a motor having an output;
    a clutch having an input and an output and being connected at its input to the output of said motor;
    a rotary indexer having an input connected to the output of said clutch and having an output connected to rotate said center stand, said rotary indexer being operable to pause the rotation of said center stand when said head is positioned in the load position, the spray position and the discharge position;
    a brake connected to selectively brake said output of said clutch when said head is in the load position, the spray position and discharge position; and
    control means for disengaging said clutch to disengage the output of said motor from said rotary indexer for a time interval, for engaging the brake to brake said output of said clutch for the time interval and for re-engaging said clutch and disengaging said brake after the time interval.

3. The apparatus of claim 1 wherein said spray means includes apparatus for spraying the fluid into the interior of the tire when said head, tire grasping means and tire are in the spray position.

4. The apparatus of claim 1 wherein said spray means includes apparatus for spraying a fluid into the interior of the tire and onto the exterior of the tire when said head, tire grasping means and tire are in the spray position.

5. The apparatus of claim 4 further comprising:
a spray nozzle;
spray nozzle support means for raising said nozzle upwardly to a raised spray position; and
supply means for selectively supplying fluid to said nozzle when in the raised spray position to spray fluid through the nozzle and into the interior of the tire when in the spray position.

6. The apparatus of claim 1 further comprising;
a tire lift for receiving and lifting a tire toward said tire grasping means when in the load position to raise the tire to a raised position for being grasped by said tire grasping means;
a first lift sensor for detecting the presence of the tire on said tire lift and for generating a lift signal in response thereto, said tire lift being responsive to said lift signal to lift the tire to the raised position; and
a second lift sensor for generating a grasp signal when said tire lift is in the raised position, said tire grasping means being responsive to the grasp signal to grasp the interior rim of the tire.

7. An apparatus for handling a tire with an interior rim and for spraying a fluid on the tire, comprising:
a center base;
a vertical shaft rotatably mounted in said center base and extending upwardly therefrom;
a motor having an output;
a rotary indexer for rotating said vertical shaft and being operable to selectively pause the rotation of said vertical shaft;
a transmission system connected between the output of said motor and said rotary indexer for selectively engaging and disengaging to selectively transmit mechanical force from said motor to said rotary indexer;
a plurality of arms extending radially outwardly from said vertical shaft and being connected to said vertical shaft for rotation therewith;
a plurality of heads with one head being mounted on each of said arms at a position distal from said vertical shaft, said heads being spaced equidistantly from said vertical shaft;
a plurality of head shafts with one head shaft extending downwardly from each head, said head shafts being rotatably mounted said heads;
a plurality of head motors mounted on said heads for rotating said head shafts;
a plurality of tire grasping finger sets with one finger set extending downwardly from each head shaft and being connected to said head shaft for rotation in unison therewith, each of said finger sets including a plurality of fingers movable between an extended position for grasping the interior rim of the tire and a retracted position for releasing the interior rim of the tire;
first actuating means for actuating each of said tire grasping finger sets when in the load position to grasp the interior rim of the tire;
second actuating means for actuating each of said head motors when in the spraying position to rotate said head shaft and tire grasping finger sets to spin the tire in the spray position; and
third actuating means for actuating each of said tire grasping finger sets when in the discharge position to release the tire; and
spray means for spraying a fluid on the tire when disposed in the spray position.

8. The apparatus of claim 7 further comprising:
a circular support plate mounted on said center base disposed beneath said arms in a parallel spaced relationship therewith;
an annular wear strip mounted on the top surface of said circular support plate adjacent to the perimeter thereof; and
a plurality of wheels with one wheel mounted on each arm and being disposed beneath the said arms for rolling on said annular wear strip to support said arms vertically.

9. The apparatus of claim 7 wherein said second actuating means comprises:
arm locator means for generating an actuate signal when one of said arms is positioned between the load position and the spray position and is approaching the spray position;
interconnection means connected between said arm locator means and said head motors for transmitting power to said head motors in response to the actuate signal, said interconnection means being operable in response to the actuate signal to transmit power to a separate one of said head motors when said arm on which said head motor is mounted is positioned between the load position and the spray position;
said arm locator means being operable to generate a deactuate signal when a separate one of said arms is positioned between the spray position and the discharge position and is leaving the spray position; and;
said interconnection means being operable in response to the deactuation signal to discontinue the transmission of power from a separate one of said head motors when said arm on which said head motor is mounted is positioned between the spray position and the discharge position.

10. The apparatus of claim 9 wherein said arm locator means comprise:
levers mounted adjacent to said arms with one lever being mounted adjacent to each of said arms, each of said levers being pivotal between a first position and a second position and being carried adjacent to said arms about said center base in a circular path;
a switch connected to said levers and being operable to generate the actuate signal when said levers are in said first position and being operable to generate the deactuate signal when said levers are in the second position;
a first inclined surface disposed in the circular path of said levers for engaging and urging said levers toward and into the first position; and
a second inclined surface disposed in the path of said levers for engaging and urging said levers toward and into the second position.

11. The apparatus of claim 7 wherein said third actuating means comprises:
means for sensing when one of said tire grasping finger sets is in the discharge position and for generating a discharge signal;
switch means mounted on said arms for controlling the position of said finger sets and being operable to switch said finger sets between the extended and retracted positions; and
an actuator mounted on said center base adjacent said arms and said switch when in the discharge position and being responsive to the discharge signal to engage said switch to operate said finger set to move to the retracted position.

12. The apparatus of claim 7 further comprising:
a tire lift for receiving and lifting a tire toward said finger set when in the load position to raise the tire to a raised position for being grasped by said finger set;
a first lift sensor for detecting the presence of the tire on said tire lift and for generating a lift signal in response thereto;
a first lift actuator for actuating said tire lift to raise the tire in response to the lift signal; and
a second lift sensor for detecting the position of said tire lift and for generating a grasp signal when said tire lift is in the raised position, said tire grasping finger set being responsive to the grasp signal to grasp the interior rim of the tire.

13. An apparatus for handling a tire having a center axis and an interior rim and for spraying a fluid on the tire, comprising:
a center base;
a vertical shaft rotatably mounted in said center base and extending upwardly therefrom;
a main motor having an output;
a rotary indexer for rotating said vertical shaft and being operable to selectively pause the rotation of said vertical shaft;
a clutch interconnected between said main motor and said rotary indexer and having an output connected to said rotary indexer for selectively engaging and disengaging the rotary indexer from said output of said main motor;
brake means for selectively braking said output of said clutch;
at least one arm extending generally horizontally outwardly from said vertical shaft and being connected to said vertical shaft for rotation therewith, said rotary indexer being operable to pause the rotation of said arms in at least a spray position;
grasp means mounted on said arm for selectively grasping and releasing the tire;
spray means for spraying the fluid on the tire when said arm is in the spray position; and
rotation control means for engaging said brake and disengaging said clutch for a time interval when the rotary indexer pauses the rotation of said vertical shaft and said arm and for reengaging the clutch and disengaging the brake after the time interval so that the rotation of the said arm is stopped for the time interval whenever the rotary indexer causes a pause in the rotation of said arm.

14. The apparatus of claim 13 further comprising:
said rotary indexer being operable to pause the rotation of said arms in at least a load position, the spray position and a discharge position;
said grasp means being operable to selective spin the tire about its center axis;
load control means for selectively actuating said grasp means when said arm and grasp means are in the load position to grasp the tire;
spin control means for actuating the grasp means to spin the tire about its center axis when said arm and grasp means are in the spray position and for selectively deactuating the grasp means to stop said grasp means from spinning the tire; and
discharge control means for actuating said grasp means to release the tire when said arm is in the discharge position.

15. The apparatus of claim 14 wherein said load control means comprise:
means for detecting when said arm is stopped and for generating a stop indication signal;
means for detecting the presence of the tire in a position for being grasped and for generating a tire presence signal;
logic means responsive to the tire presence signal and to the stop indication signal for generating a grasp signal;
a switch mounted on said arm for controlling said grasp means to selectively grasp and release the tire; and
actuator means responsive to the grasp signal to engage said switch for actuating said grasp means to grasp the tire.

16. The apparatus of claim 14 wherein said discharge control means comprises:
means for detecting when said arm is stopped and for generating a stop indication signal;
logic means responsive to said stop indication signal for generating a discharge signal;
a switch mounted on said arm for controlling said grasp means to selectively grasp and release the tire;
actuator means responsive to the discharge signal to engage said switch for actuating said grasp means to release the tire.

17. The apparatus of claim 14 wherein said spin control means comprises:
switch means mounted adjacent to said arm for controlling the grasp means to selectively spin the tire, said switch means being carried by said arm in a circular path about said center base;
first engagement means positioned in the path of said switch means for engaging and actuating said switch to start and operate said grasp means to spin the said tire; and
second engagement means positioned in the path of said switch means for engaging said switch to deactuate said grasp means to discontinue the spinning of the tire.

* * * * *